(12) United States Patent
Reuter et al.

(10) Patent No.: US 12,722,436 B2
(45) Date of Patent: Sep. 1, 2026

(54) CRASH MANAGEMENT SYSTEM FOR A MOTOR VEHICLE

(71) Applicant: CONSTELLIUM SINGEN GmbH, Singen (DE)

(72) Inventors: Stephan Reuter, Trossingen (DE); Kai Schwarz, Gottmadingen (DE); Heiko Habich, Engen (DE); Robert Elsaesser, Engen (DE)

(73) Assignee: CONSTELLIUM SINGEN GmbH, Singen (DE)

( * ) Notice: Subject to any disclaimer, the term of this patent is extended or adjusted under 35 U.S.C. 154(b) by 320 days.

(21) Appl. No.: 18/402,940

(22) Filed: Jan. 3, 2024

(65) Prior Publication Data

US 2024/0239410 A1 Jul. 18, 2024

(30) Foreign Application Priority Data

Jan. 16, 2023 (EP) .................................... 23151798

(51) Int. Cl.
*B60D 1/56* (2006.01)
*B60R 19/48* (2006.01)
*B62D 29/00* (2006.01)

(52) U.S. Cl.
CPC .............. *B60D 1/565* (2013.01); *B60R 19/48* (2013.01); *B62D 29/008* (2013.01)

(58) Field of Classification Search
CPC ............ B60D 1/565; B60D 1/56; B60R 19/48
See application file for complete search history.

(56) References Cited

U.S. PATENT DOCUMENTS 6,929,297 B2 * 8/2005 Muller ................... B60D 1/488 293/133
8,020,906 B2 * 9/2011 Schmid ................... B60R 19/34 293/133
8,590,950 B2 * 11/2013 Hermanson ............ B60D 1/565 293/117

(Continued)

FOREIGN PATENT DOCUMENTS

CN 111267763 A * 6/2020 ............. B60D 1/565
CN 215553013 U * 1/2022

(Continued)

*Primary Examiner* — Jason S Morrow
(74) *Attorney, Agent, or Firm* — Ladas & Parry LLP; Malcolm J. MacDonald, Esq.

(57) ABSTRACT

The invention relates to a crash management system (100) for a motor vehicle, the crash management system (100) comprising: a crossbeam (10) having a front wall (16), a rear wall (18) and at least two transverse walls (19, 20) connecting the front wall (16) to the rear wall (18) and forming a closed cross section of the crossbeam (10); crash boxes (12) disposed at a distance from each other and connected to the crossbeam (10) and configured to connect the crossbeam (10) to a vehicle structure; and a receiving element (25) for attaching a towing lug, the receiving element (25) being connected to the crossbeam (10) laterally next to one crash box (12), the crossbeam (10) having respective receiving openings (47, 48) in the area of its front wall (16) and its rear wall (18), each receiving opening (47, 48) being adapted to the cross section of the receiving element (25).

12 Claims, 1 Drawing Sheet

(56) References Cited

U.S. PATENT DOCUMENTS

| | | | | |
|---|---|---|---|---|
| 8,678,423 | B1 * | 3/2014 | Hwang | B60R 19/34 |
| | | | | 280/505 |
| 12,017,490 | B2 * | 6/2024 | Schiller | B60R 19/18 |
| 12,508,856 | B2 * | 12/2025 | Kim | B60D 1/56 |
| 2024/0399989 | A1 * | 12/2024 | Ryutaki | B60D 1/565 |
| 2026/0054535 | A1 * | 2/2026 | Babymony | B60D 1/565 |

FOREIGN PATENT DOCUMENTS

| | | | | | |
|---|---|---|---|---|---|
| CN | 216805041 | U | * | 6/2022 | |
| CN | 118673603 | A | * | 9/2024 | G06F 30/23 |
| CN | 118753377 | A | * | 10/2024 | B60R 19/52 |
| DE | 10 2019 108 907 | B4 | | 10/2020 | |
| DE | 102019216208 | A1 | * | 4/2021 | B60D 1/565 |
| DE | 102021117482 | A1 | * | 1/2023 | B60D 1/565 |
| DE | 102019124020 | B4 | * | 3/2023 | B60R 19/48 |
| EP | 3 085 554 | B1 | | 10/2016 | |
| GB | 2567477 | A | * | 4/2019 | B60R 19/34 |
| JP | 2012232649 | A | * | 11/2012 | |
| JP | 2021172130 | A | * | 11/2021 | |

* cited by examiner

CRASH MANAGEMENT SYSTEM FOR A MOTOR VEHICLE

FIELD OF THE INVENTION

The invention relates to a crash management system for a motor vehicle in which a receiving element for a towing lug can be attached to a crossbeam in an area outside of crash boxes and partially below or above the cross section of the crossbeam in a particularly simple and advantageous manner.

BACKGROUND

A crash management system for a motor vehicle having the features of the preamble of claim 1 is known from EP 3 085 554 B1. The known crash management system is characterized by a crossbeam having receiving openings for attaching a receiving element for a towing lug in the area of a front wall and a rear wall of the crossbeam outside of the area of crash boxes. If needed, the towing lug is typically fixed in the receiving element by screwing in a threaded portion on the towing lug. The known receiving element or the receiving openings in the area of the front wall and the rear wall of the crossbeam each have a circular cross section, the receiving element being connected to the crossbeam in the area of the front wall and the rear wall by a weld seam. The essential aspect is that the (circular) receiving openings and the receiving element are fully disposed in the area between an upper edge and a lower edge of the front wall and the rear wall, i.e., within the cross section of the crossbeam.

Furthermore, it is known from DE 10 2019 108 907 B4 for an extruded receiving element for a towing lug to be provided with at least one groove at its outer surface. The at least one groove serves to fix the receiving element in the cross section of the crossbeam in a force-fitting manner by deforming the crossbeam, i.e., pushing a portion of the crossbeam into the at least one groove. From this document, it is also known for the receiving element to be fully disposed in the area of the cross section of the crossbeam.

DESCRIPTION OF THE INVENTION

The crash management system for a motor vehicle according to the invention with the features of claim 1 has the advantage that it allows the receiving element for the towing lug to be disposed in such a manner that at least part of it is located outside of the cross section of the crossbeam while being cost-efficient and relatively simple to produce.

The invention is based on the idea of making it possible for the receiving element to be disposed on the crossbeam in such a manner through a special shape of the receiving openings for the receiving element on the front wall and the rear wall of the crossbeam (and a correspondingly shaped cross section of the receiving element) that it is positioned in a definite and self-locking manner in a direction perpendicular to the longitudinal direction of the crossbeam and the receiving element is prevented from dropping out of the area of the crossbeam.

Against the background of the above explanations, it is therefore provided a crash management system for a motor vehicle, the crash management system comprising: a crossbeam having a front wall, a rear wall and at least two transverse walls connecting the front wall to the rear wall and forming a closed cross section of the crossbeam, said crash boxes are disposed at a distance from each other and connected to the crossbeam and configured to connect the crossbeam to a vehicle structure; and a receiving element for attaching a towing lug, the receiving element being connected to the crossbeam laterally next to one crash box, the crossbeam having respective receiving openings in the area of its front wall and its rear wall, each receiving opening being adapted to the cross section of the receiving element, the receiving element passing through the two receiving openings, and the receiving element having an end face on the side facing the rear wall, the end face of the receiving element being in contact with the rear wall on the side facing away from the front wall, wherein the receiving element is an extruded part made of aluminum or an aluminum alloy, at least one of the two receiving openings borders a lower edge or an upper edge of the front wall or the rear wall, the cross section of at least one of the receiving openings being cross section that is open in the area of the lower edge or the upper edge and has an opening width w, the cross section of the receiving element disposed in the area of the open receiving opening having a greatest width B parallel to the lower edge or the upper edge in the area of the open receiving opening, said width B being greater than the opening width w, and a part of the receiving element protrudes from the open receiving opening over the lower edge or the upper edge.

in a crash management system for a motor vehicle according to the invention with the features of claim 1 that the receiving element is an extruded part made of aluminum or an aluminum alloy, at least one of the two receiving openings borders a lower edge or an upper edge of the front wall or the rear wall, the cross section of at least one of the receiving openings being a cross section that is open in the area of the lower edge or the upper edge and has an opening width, the cross section of the receiving element disposed in the area of the open receiving opening has a greatest width parallel to the lower edge or the upper edge in the area of the open receiving opening, said width being greater than the opening width, and a part of the receiving element protrudes from the open receiving opening over the lower edge or the upper edge.

Advantageous embodiments of the crash management system for a motor vehicle according to the invention are indicated in the dependent claims.

In case the crossbeam has about the same height in the area of its front wall and its rear wall, both receiving openings are receiving openings that are open in the area of the lower edge or the upper edge of the front wall and the rear wall.

Moreover, it is most particularly preferred for the receiving element and at least one of the two receiving openings to have a cross section configured in such a manner that the receiving element is positioned in the crossbeam in a non-rotating manner with respect to a longitudinal hole in the receiving element.

In order to enable the receiving element to come into axial contact with the rear wall of the crossbeam with as large a contact surface as possible, it is advantageous for the end face being in contact with the rear wall to be a shoulder running around a circumferential surface of the receiving element.

In order to achieve a precise fit of the cross section of the receiving element in the area of the receiving openings on the crossbeam and to also enable the enlargement of the cross section (shoulder) for axial positioning of the receiving element on the crossbeam as provided for in the invention, the cross section of the portion of the receiving element passing through the crossbeam is machined.

In order to be able to mount the receiving element on the crossbeam in the longitudinal direction and to captively connect it to the crossbeam, the crossbeam is made of aluminum or an aluminum alloy and the receiving element is welded to the crossbeam at least in the area of the front wall and/or the rear wall.

For the simple manual fixation of the towing lug in the receiving element, the receiving element has a threaded portion for receiving the towing lug, the threaded portion extending in the longitudinal direction, at least part of the cross section of the threaded portion protruding over the lower edge or the upper edge of the front wall.

For disposing the receiving element in the crossbeam in a captive and non-rotating manner, the cross section of the receiving element is trapezoidal at least in the area of the portion of the receiving element passing through the crossbeam, with two longitudinal sides running parallel to the transverse walls and two transverse sides running at angles relative to the transverse walls.

In particular in order to reduce notching effects when forces are introduced from the receiving element into the crossbeam during towing, it is advantageous, moreover, for the cross section of the receiving element to have curves, i.e., no rough edges, at least in the area of the portion of the receiving element passing through the crossbeam.

With regard to the introduction of forces, it is also advantageous if the cross section of the receiving element is symmetrical to a plane perpendicular to the longitudinal direction of the crossbeam at least in the area of the portion of the receiving element passing through the crossbeam.

Furthermore, disposing the receiving element in the area of the crossbeam may require for a transverse wall extending at the height of the lower edge or the upper edge in the area of the cross section of the receiving element to have a recess. The recess has a width corresponding at least to the opening width of the receiving opening.

Other advantages, features and details of the invention are apparent from the following description of preferred embodiments of the invention and from the drawings.

DETAILED DESCRIPTION OF THE INVENTION

Figure 1:
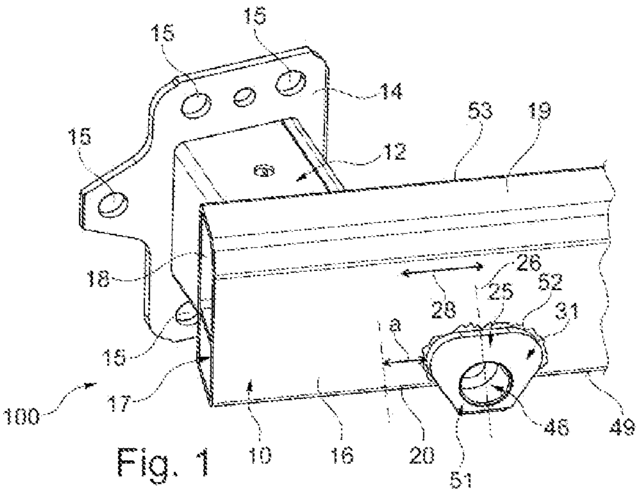
FIG. 1 is a perspective view of a portion of a crash management system for a motor vehicle in the area of a crash box and a receiving element for receiving a towing lug.

Identical elements and elements having the same function are designated by the same reference numerals in the figures.

FIG. 1 shows components of a crash management system 100, which comprises a crossbeam 10 and two crash boxes 12, which are connected to a vehicle structure (not shown) in the area of longitudinal beams. FIG. 1 shows only one of the two crash boxes 12, the other crash box 12, which is not illustrated, being disposed to the right of the illustrated crash box 12 in the drawing plane of FIG. 1. Crash boxes 12 are connected to the vehicle structure (longitudinal beams) via respective mounting plates 14 of crash boxes 12 and their screw holes 15. Furthermore, crash boxes 12 are connected to crossbeam 10 by welds (not shown) as an example.

As an example, crossbeam 10, which is an extruded part, has a closed rectangular cross section having at least one chamber 17. Furthermore, the cross section of crossbeam 10 comprises a (plane) front wall 16, which is disposed on the opposite side of crash boxes 12, an equally plane rear wall 18, which is disposed parallel to front wall 16 and in whose area crash boxes 12 are connected (welded) to crossbeam 10, and an upper transverse wall 19 and a lower transverse wall 20, which are formed monolithically with front wall 16 and rear wall 18.

Figure 3:
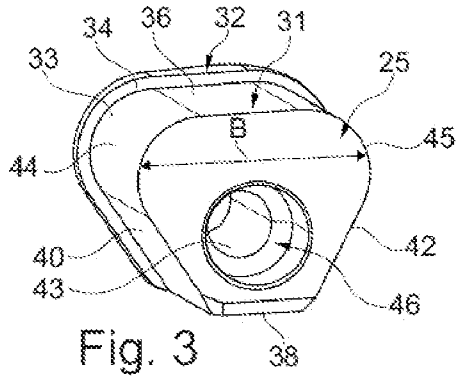
FIG. 3 is a perspective view of the receiving element for the towing lug used in FIG. 1.

As an example, a receiving element 25 for receiving a towing lug (not shown) is connected to crossbeam 10 at a distance a from crash box 12 illustrated in FIG. 1, i.e., laterally next to crash box 12 and between the two crash boxes 12. Receiving element 25, which is an extruded part and shown on its own in FIG. 3, is symmetrical to a longitudinal plane 26, which is perpendicular to a longitudinal direction 28 of crossbeam 10. Receiving element 25 has a first portion 31, which passes through the cross section of crossbeam 10 in the area of its front wall 16 and its rear wall 18 and preferably protrudes slightly from front wall 16. Furthermore, first portion 31 has a constant outer cross section.

A second portion 32 of receiving element 25 is adjacent to first portion 31 on the side facing crash boxes 12, second portion 32 having a larger cross section than first portion 31 with the result that it has a shoulder 34, which extends parallel to rear wall 18 and perpendicularly projects from an outer circumference 33 of first portion 31. When receiving element 25 is installed on crossbeam 10, shoulder 34 is in flush or full contact with rear wall 18 when viewed in the longitudinal direction of receiving element 25 and acts as an axial stop element in the direction of front wall 16.

Receiving element 25 has a trapezoidal (outer) cross section in the area of portion 31, which passes through crossbeam 10. In particular, the cross section of receiving element 25 has two plane longitudinal sides 36 and 38, which run parallel to the two transverse walls 19 and 20, and two plane transverse sides 40 and 42, which run perpendicular thereto. In the area of transition between the two transverse sides 40 and 42 and longitudinal side 36, which has the greater width, the cross section of receiving element 25 is provided with curves 44 and 45. Moreover, receiving element 25 has a longitudinal hole 46, which is aligned with longitudinal plane 26 of receiving element 25 and in which at least one threaded portion 43 is formed so as to be able to screw the towing lug (not shown) into threaded portion 43. While second portion 32 of receiving element 25 may be mechanically unworked, outer circumference 33 of first portion 31 is produced or worked by a machining manufacturing process.

In order to be able to receive receiving element 25 in crossbeam 10, crossbeam 10 has a first receiving opening 47 in the area of its front wall 16 and a second receiving opening 48 in the area of its rear wall 18, the two receiving openings 47 and 48 being through holes. The two receiving openings 47 and 48 are preferably identical and are adapted to the cross section of first portion 31 of receiving element 25 in such a manner that a small gap is formed between outer circumference 33 of receiving element 25 and receiving openings 47 and 48, the gap allowing receiving element 25 to be simply slid axially into receiving openings 47 and 48.

Figure 2:
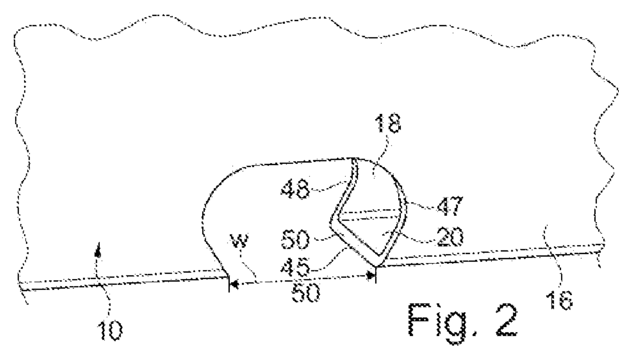
FIG. 2 is a perspective view of a portion of the crossbeam in the area of two receiving openings for receiving the receiving element.

As can be seen from FIG. 2, it is essential, moreover, that the two receiving openings 47 and 48 border lower edge 49 of front wall 16 and rear wall 18 and are open receiving openings 47 and 48 on the side facing lower transverse wall 20 and have an opening width w, to which end lower transverse wall 20 has a recess 50. Furthermore, receiving element 25 has a maximum width B parallel to lower transverse wall 20 in the area of receiving openings 47 and 48, maximum width B being greater than opening width w with the result that receiving element 25 is positioned or fixed in receiving openings 47 and 48 in the direction of longitudinal plane 26 and receiving element 25 is also disposed in crossbeam 10 in a non-rotating manner with respect to longitudinal hole 46 because of the trapezoidal cross sections.

Receiving openings 47 and 48 are aligned with part of the cross section of first portion 31 of receiving element 25 in such a manner that a part 51 of first portion 31 extends below lower transverse wall 20, i.e., protrudes from crossbeam 10, part of the cross section of longitudinal hole 46 in receiving element 25 also extending outside of the cross section of crossbeam 10.

Furthermore, FIGS. 1 and 2 show that the cross section of the two receiving openings 47 and 48 is identical or has only a small gap between the two receiving openings 47 and 48 and first portion 31 in the area of first portion 31 of receiving element 25. This allows receiving element 25 to simply be inserted from the side of rear wall 18 in the direction of front wall 16 while also allowing receiving element 25 to be connected to crossbeam 10 by welds 52 from the side of front wall 16 and rear wall 18 in the area of the two receiving openings 47 and 48. Moreover, both receiving element 25 and crossbeam 10 are made of aluminum or an aluminum alloy for this purpose.

Crash management system 100 described above, in particular the cross sections of receiving element 25 and crossbeam 10, can be altered or modified in various ways without departing from the spirit of the invention. For instance, front wall 16 and rear wall 18 have the same height according to the exemplary embodiment. However, crossbeams 10 whose front wall 16 and rear wall 18 have different heights are possible as well. As a result, only one of receiving openings 47 and 48 may be an open receiving opening 47 or 48, while the other receiving opening 47 or 48 may have a closed shape or a closed cross section. In this case, too, however, receiving element 25 protrudes from front wall 16 or rear wall 18 in the area of the front wall 16 or the rear wall 18 having the smaller height. Furthermore, it is of course possible for the receiving element 25 to be disposed in the area of upper transverse wall 19 instead of on the side of lower transverse wall 20. In this case, part of receiving element 25 protrudes over the area of upper edge 53 of front wall 16 or rear wall 18.

LIST OF REFERENCES

10 crossbeam
12 crash box
14 mounting plate
15 screw hole
16 front wall
17 chamber
18 rear wall
19 upper transverse wall
20 lower transverse wall
25 receiving element
26 longitudinal plane
28 longitudinal direction
31 first portion
32 second portion
33 outer circumference
34 shoulder
36 longitudinal side
38 longitudinal side
40 transverse side
42 transverse side
43 threaded portion
44 curve
45 curve
46 longitudinal hole
47 receiving opening
48 receiving opening
49 lower edge
50 recess
51 part
52 weld
53 upper edge
100 crash management system
w opening width
a distance
B width

The invention claimed is:

1. A crash management system for a motor vehicle comprising: a crossbeam having a front wall, a rear wall and at least two transverse walls connecting the front wall to the rear wall and forming a closed cross section of the crossbeam; crash boxes disposed at a distance from each other and connected to the crossbeam and configured to connect the crossbeam to a vehicle structure; and a receiving element for attaching a towing lug, the receiving element being connected to the crossbeam laterally next to one crash box, the crossbeam having respective receiving openings in an area of a front wall of the crossbeam and in an area of the rear wall of the crossbeam, each receiving opening being adapted to a cross section of the receiving element, the receiving element passing through the two receiving openings, and the receiving element having an end face on a side facing the rear wall, the end face of the receiving element being in contact with the rear wall on a side facing away from the front wall, wherein the receiving element is an extruded part made of aluminum or an aluminum alloy, at least one of the two receiving openings borders a lower edge or an upper edge of the front wall or the rear wall, the cross section of at least one of the receiving openings being a cross section that is open in the area of the lower edge or the upper edge and has an opening width, the cross section of the receiving element disposed in the area of the open receiving opening having a greatest width parallel to the lower edge or the upper edge in an area of the open receiving opening, said width being greater than the opening width, and a part of the receiving element protrudes from the open receiving opening over the lower edge or the upper edge.

2. The crash management system according to claim 1, wherein the two receiving openings are receiving openings that are open in an area of the lower edge or the upper edge of the front wall and the rear wall.

3. The crash management system according to claim 1, wherein the receiving element and at least one of the two receiving openings have a cross section configured in such a manner that the receiving element is positioned in the crossbeam in a non-rotating manner with respect to a longitudinal hole in the receiving element.

4. The crash management system according to claim 1, wherein the end face is a shoulder running around an outer circumference of the receiving element.

5. The crash management system according to claim 1, wherein the cross section of a portion of the receiving element passing through the crossbeam is machined.

6. The crash management system according to claim 1, wherein the crossbeam is made of aluminum or an aluminum alloy, and the receiving element is welded to the crossbeam at least in an area of the front wall and/or the rear wall.

7. The crash management system according to claim 1, wherein the receiving element has a threaded portion for receiving the towing lug, and a cross section of the threaded portion at least partially protrudes over the lower edge or the upper edge of the front wall.

8. The crash management system according to claim 1, wherein the cross section of the receiving element is trapezoidal at least in the area of the portion of the receiving element passing through the crossbeam, with two longitudinal sides running parallel to the transverse walls and two transverse sides running at an angle to the transverse walls.

9. The crash management system according to claim 1, wherein the cross section of the receiving element has curves at least in the area of the portion of the receiving element passing through the crossbeam.

10. The crash management system according to claim 1, wherein the cross section of the receiving element is symmetrical to a plane perpendicular to a longitudinal direction of the crossbeam at least in an area of a portion of the receiving element passing through the crossbeam.

11. The crash management system according to claim 1, wherein the crossbeam is an extruded part.

12. The crash management system according to claim 1, wherein a transverse wall extending at a height of the lower edge or the upper edge in an area of the cross section of the receiving element has a recess.

* * * * *